United States Patent Office 3,261,077
Patented July 19, 1966

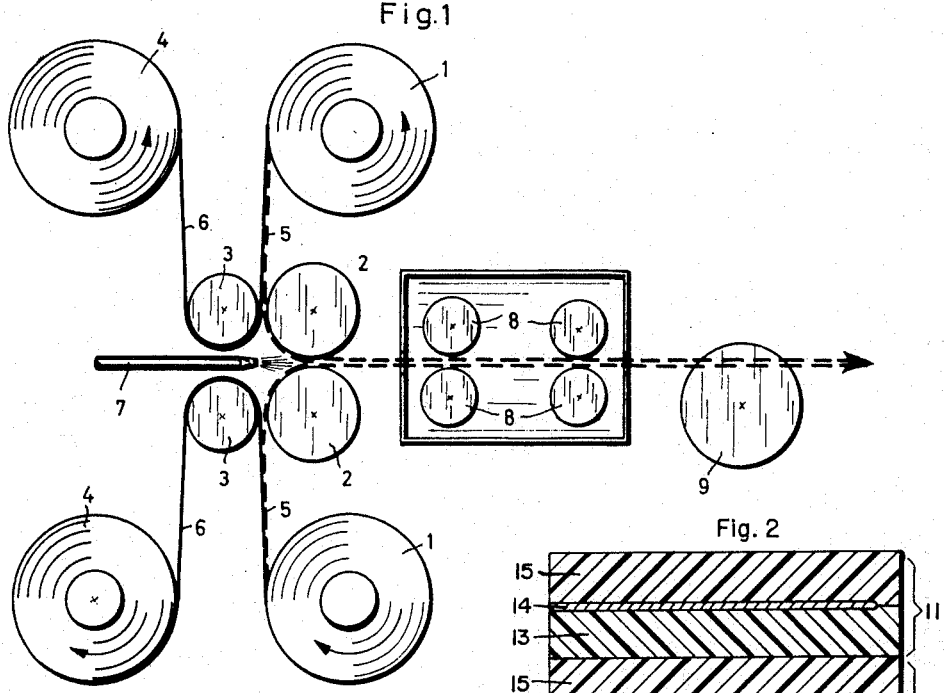
Fig. 1
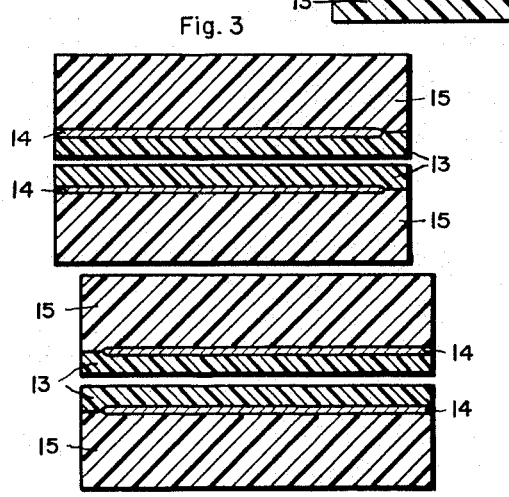
Fig. 2
Fig. 3

3,261,077
METHOD OF PRODUCING REGENERATIVE CAPACITORS
Johannes Meisinger, Munich, Germany, assignor to Siemens & Halske Aktiengesellschaft Berlin and Munich, a corporation of Germany
Filed Feb. 19, 1962, Ser. No. 174,188
Claims priority, application Germany, Feb. 23, 1961, S 72,680
5 Claims. (Cl. 29—25.42)

This invention is concerned with an improvement on the method of producing an electrical capacitor, employing a thin band or foil with a thickness amounting preferably to less than 6 microns and preferably provided with a thin regenerative coating, as disclosed in the prior application Serial No. 86,518, filed February 1, 1961, which is owned by the assignee also named in the present application.

According to such prior method, a first thin varnish layer is provided upon a suitable carrier foil and upon such first varnish layer is placed a thin regenerative metal coating, thereby leaving vacant a marginal area, whereupon a second, preferably thicker varnish is disposed thereon. The three-layer foil comprising two varnish layers and a metal layer is thereupon separated from the carrier foil, and from at least two such three-layer foils having metal coatings which are mutually displaced, is formed a capacitor.

The advantage of a capacitor constructed according to the method disclosed in such prior application resides primarily in that the second, preferably thicker varnish layer is completely free of pin-like projections, since no metal coating is vaporized thereon, having therefore an extraordinarily high breakdown strength. It has also been found that the contacting of the coating enclosed between two varnish layers, by vaporization of metallic particles, is surprisingly effective. The quality of the contacting is detrimentally affected only when the winding layers run in the winding operation mutually in such a manner that the metal particles cannot reach the coating incident to the subsequent vaporization.

In accordance with the invention, this drawback can be largely avoided by cementing or otherwise firmly interconnecting two or more of the individual three-layer foils together before the common winding thereof. Upon winding the capacitor, only one single band need then be wound upon the winding mandrel. A straying of the individual band foils is therefore impossible.

The interconnection of the three-layer foils may be effected in simple manner by introducing therebetween a solving agent, for example, spraying such agent therebetween, and pressing the three-layer foils together.

The strength of the mutually interconnected or bonded three-layer foils is greater than that of the individual foils, and it is therefore possible to further process the foils without the carrier by freely guiding such foils. The carrier foils therefore can be separated from the thin foils directly ahead of the cementing or thereafter.

The method disclosed herein is particularly adapted for making capacitors of the type such as described in copending application Serial No. 104,268, filed April 20, 1961, now 3,123,895, issued March 10, 1964, which copending application proposes to provide upon a suitable supporting foil a first varnish layer to which is applied a thin regenerative metal coating extending therealong except for a marginal strip-like zone thereof which is left vacant or free of the metal coating, placing upon the metal coating a second varnish layer corresponding in width to that of the first varnish layer, stripping from the supporting foil the resulting three-layer foil consisting of two varnish layers and one metal coating, and thereupon producing a capacitor from at least four such three-layer foils which are assembled or arranged one upon the other so that respective identical varnish layers are in mutual engagement, whereby the metal coatings extending along the correpsonding vacant marginal zones are brought in mutual engagement and connected with exterior current leads in such a manner that the first varnish layers are disposed in the space which is free of a field while the second varnish layers are dielectrically effective.

Capacitors constructed in this manner provide various advantages. Since the varnish layers upon which are vaporized the metal coatings lie in the finished capacitor in the space which is free of the field, pin-like metal points, formed in the metallizing operation and projecting through pores of the corresponding varnish layers interiorly of the material thereof, remain harmless and do not cause a reduction of the breakdown strength of the capacitor. The dielectrically effective varnish layers are, however, free of such pin-like metal points projecting into the material thereof, and it is, therefore, possible to obtain with very thin layers extraordinarily high breakdown strength.

Moreover, the construction of capacitors according to the method described in the copending application permits the use of dielectrics which are as such not regenerative, as dielectrically effective layers, provided care is taken that the regenerative function is secured by the layers lying in the space which is free of the field. It is thus possible, for example, to use polystyrol as dielectrically effective layer material, by employing acetylcellulose as a material for the first layer which lies in the space which is free of the field. A capacitor is in this manner produced which exhibits a favorable regenerative behavior, at the same time utilizing the good dielectric characteristic of the polystyrol.

However, there remained until now difficulties attending the production of capacitors according to the procedure described in said copending application Serial No. 104,268, which prevented the general use thereof despite the extraordinarily favorable results that may be achieved. These difficulties reside in the necessity of simultaneously winding four three-layer foils, each consisting of two varnish layers and one metal coating, at the same time taking care of separating (stripping) the individual three-layer foils from their respective supporting foils, in a manner such that free advance of the respective thin foils is prevented prior to or during the winding operation. It was thereby extraordinarily difficult to prevent incident to the winding operation, a lateral straying or displacement of the individual foils one with respect to the other. Occurrence of such displacement increased very much the contacting of parts by spraying of metal particles at the ends of the wrapped capacitor package, making the contacting of parts of the metal coatings practically impossible. However, poor contacting results in higher loss factors and therewith in poor capacitors. The cementing or otherwise fixedly joining of at least each two of the three-layer foils prior to the winding thereof to form a wrapped capacitor package also overcomes these difficulties.

Further detail of the invention will appear from the description which is rendered below with reference to the accompanying drawing.

FIG. 1 represents a device for joining or bonding in simple manner two three-layer foils formed upon respective carrier- or supporting foils;

FIG. 2 shows a foil formed according to the invention by two three-layer foils; and FIG. 3 shows in cross-sectional view the construction of a capacitor made from four three-layer foils.

Referring now to FIG. 1, numeral 1 indicates supply reels or rollers upon each of which are wound band-like supporting foils 6 carrying three-layer foils 5. The foils 5 are advanced to deflection rollers respectively indicated by numeral 2 where they are separated from their supporting foils 6, the latter being advanced over deflection rollers 3 to the carrier supply reels 4 upon which they are wound. Between the deflection rollers 3 is disposed a device 7, for example, a vaporizer or a spray nozzle, for introducing a suitable cementitious substance or a solvent between the three-layer foils 5 at the point where they meet upon advancing over the deflection rollers 2, thus effecting the joining thereof. The joined composite three-layer foils are thereupon advanced through a device containing pressure rollers 8 which press them together to secure the bonding thereof, such device also containing suitable means for drying the bonded composite foils.

Numeral 9 indicates a device for thereupon cutting the joined composite three-layer foils to the required width for winding capacitors therefrom. The cutting operation is thus effected after the three-layer foils 5 had been separated from their supporting bands or foils 6 and the latter can therefore be reused for the production of thin foils. The present invention thus provides a further advantages since it was until now necessary to effect the cutting while the thin foils were still attached to their respective supporting bands, thereby producing waste as the cut supporting bands could not be reused. The individual thin foils are prior to the inter-bonding thereof protected against tearing partly by the carrier moving along therewith and partly by the deflection rollers 2. The double foil is of a thickness so that it can be freely guided for the drying, cutting and winding thereof.

FIG. 2 shows a foil formed by the interconnection or bonding of two three-layer foils, each of which is formed by a first dielectric layer 13, a metal layer or coating 14, and a second, preferably thicker dielectric layer 15. Two such three-layer foils 11 and 12 are at the mutually engaging surfaces connected or bonded together, for example, with the aid of a cementing agent or a solvent which acts on the dielectric layer.

It is understood, of course, that the metallic layers or coatings of the two three-layers foils 11 and 12 are, as in the finished capacitor mutually displaced, so as to provide for separate contacting of the coatings by spraying contact layers with respect to the contact layers at the ends of the structure.

FIG. 3 shows in cross-sectional view the construction of a capacitor made of four three-layer foils, whereby each individual three-layer foil consists of a layer 13' of acetylcellulose or similar well regenerative substance, a metal layer 14', and a layer 15' of a substance with good dielectric properties, preferably polystyrol.

The joining or bonding of two or more three-layer foils, in the construction of FIG. 3, as previously described with respect to the construction of FIG. 2, can be in simple manner effected, for example, by introducing solvent medium between the three-layer foils, for example by injection, and pressing layers together along the path of motion for the winding thereof. In the case the layers which are to lie in the space which is free of the field are made of acetal cellulose, they can be joined together by means of a solvent medium.

Moreover, the joining of two or more three-layer foils prior to the winding operation makes it possible to separate (strip) the thin foils from their supporting foils directly prior to or after the bonding instead of effecting such separation incident to the winding of the coils to form a wrapped capacitor.

Changes may be made within the scope and spirit of the appended claims which define what is believed to be new and desired to have protected by Letters Patent.

I claim:

1. A method of making an electrical capacitor, comprising the steps of placing upon a suitable auxiliary supporting foil a first varnish layer, providing upon said first varnish layer a thin metal coating, leaving a strip-like marginal zone bare of metal coating, disposing upon said metal coating a second varnish layer, assembling a plurality of said three-layer foils to form a capacitor by disposing at least one of such foils with the marginal zone thereof disposed at one edge of the assembly and disposing at least one other of such foils with the marginal zone thereof disposed at the opposite edge of the assembly, firmly bonding together at least two of such three-layer foils to form a composite foil, and winding the so assembled foils to form a wrapped capacitor body.

2. A method according to claim 1, comprising assembling four such three-layer foils by disposing said foils in pairs with said first varnish layers face to face and one foil of each pair being reversed with respect to the other foil therewith with the strip-like bare marginal zones being disposed at the same edge of the assembled pair, and said pairs being disposed with said second varnish layers face to face and said strip-like marginal zone of one pair being disposed at the opposite edge of the assembly as the marginal zone of the adjacent pair.

3. A method according to claim 1, comprising introducing a solvent between the three-layer foils which are to be bonded together, and pressing such foils together to secure the bonding thereof.

4. A method according to claim 1, comprising separating the three-layer foils from their respective auxiliary supporting foils and thereafter bonding such foils.

5. A method according to claim 1, comprising separating the three layer foils from their respective auxiliary supporting foils immediately prior to the bonding thereof, thereupon bonding the separated foils, and rewinding said supporting foils to recover the same for reuse in forming thereon further three-layer foils.

References Cited by the Examiner

UNITED STATES PATENTS

| | | | |
|---|---|---|---|
| 1,889,177 | 11/1932 | Keller | 156—307 |
| 2,037,744 | 4/1936 | Van Derhoef | 156—307 |
| 2,275,858 | 3/1942 | Mallard | 242—67.3 |
| 2,336,754 | 12/1943 | Schelhammer | 242—67.3 |
| 2,907,097 | 10/1959 | Tzu En Shen | 29—25.42 |
| 2,958,117 | 11/1960 | Robinson et al. | 29—25.42 |
| 3,123,895 | 3/1964 | Henninger | 29—25.42 |

FOREIGN PATENTS 548,530   11/1957   Canada.

RICHARD H. EANES, Jr., *Primary Examiner.*

LEON PEAR, *Examiner.*

G. A. DOST, *Assistant Examiner.*